United States Patent [19]

Sunderman

[11] 3,782,570
[45] Jan. 1, 1974

[54] AUTOMATIC LOADING AND UNLOADING BALE WAGON

[76] Inventor: Lavern C. Sunderman, R.R. No. 3, Box 207, Clarinda, Iowa 51632

[22] Filed: Nov. 1, 1971

[21] Appl. No.: 194,672

[52] U.S. Cl................ 214/519, 198/7 BL, 198/103
[51] Int. Cl............................................. B60p 1/36
[58] Field of Search.................. 214/519, 522, 518, 214/38 A; 198/7 BL

[56] References Cited
UNITED STATES PATENTS

| | | | |
|---|---|---|---|
| 2,784,859 | 3/1957 | Brownlee | 214/519 |
| 2,867,340 | 1/1959 | Brownlee | 214/521 |
| 2,761,578 | 9/1956 | Brownlee | 214/522 |
| 3,341,039 | 9/1957 | Clanage | 198/7 BL |
| 3,074,569 | 1/1963 | Ajero | 214/38 A |

FOREIGN PATENTS OR APPLICATIONS 315,068  8/1956  Sweden........................ 214/38 A Primary Examiner—Gerald M. Forlenza
Assistant Examiner—Kenneth Noland
Attorney—H. Robert Henderson et al.

[57] ABSTRACT

A wagon has rotatable storage compartments for receiving rows of bales, an endless loading conveyor below the lowest position to which the compartments are successively rotated, and a pick-up endless conveyor pivotally mounted in front of the loading conveyor. The chassis of the wagon supporting the storage compartments is pivoted on a wheeled chassis. The two chasses are aligned for transportation or are positioned at an angle for field operation; in the latter position, the pick-up conveyor lifts bales that are along one side of the path traveled by a tractor connected to the draw bar of the wagon. The rotatable storage compartments comprise a rotor resembling an elongated paddle and a fixed support that is semi-circular in cross section; the fixed support is mounted slightly below the positions of the compartments while their open sides are facing downwardly and support the bales until the compartments are rotated until the bales are supported only by the rotor.

8 Claims, 7 Drawing Figures

INVENTOR.
LAVERN C. SUNDERMAN
BY Glenn H. Antrim
Attorney

PATENTED JAN 1 1974

INVENTOR.
LA VERN C. SUNDERMAN
BY Glenn N. Antrim
Attorney

AUTOMATIC LOADING AND UNLOADING BALE WAGON

BACKGROUND OF THE INVENTION

This invention relates to improvements in automatic loading and unloading bale wagons.

Commonly, bales of either hay or straw are loaded from a machine into a wagon where they are arranged manually, or they are first discharged from a machine onto the ground and later have to be manually picked up and placed into a loader or directly into a wagon. In either event, the bales are likely to be distributed or loaded in the wagon manually.

A machine for picking up and loading bales automatically is shown in U.S. Pat. No. 2,867,340 issued to G.R. Brownlee et al. on Jan. 6, 1959. A large drum is mounted on rollers at the top of a wheeled chassis, and it has dividers for forming longitudinal compartments for rows of bales. A front pick-up conveyor is a screw conveyor slanting downwardly to the ground to pick up the bales and moves them to a long loading screw conveyor along the bottom of the wagon. The loading conveyor fits in a longitudinal slot in the outer wall of the drum along a selected one of the compartments that has been positioned downwardly opposite the conveyor by rotation of the drum. When the loading conveyor receives the bales that have been started in the end of the selected compartment by the pick-up conveyor, it moves them rearwardly along the slot on the inner surface of the outer wall of the drum, and when this compartment is filled, the drum including its outer wall will be rotated until an empty compartment is aligned with the loading screw conveyor. The machine includes a complicated arrangement for moving the loading screw conveyor outwardly or downwardly when selecting a different compartment so that it does not interfere with rotation of the drum.

An earlier U.S. Pat. No. 2,761,578 issued to the same inventors on Sept. 4, 1956 also shows a revolving drum, but a reciprocating arm rather than a pickup screw conveyor is shown for pushing bales into the drum. A belt conveyor is positioned below a compartment that is in its uppermost position for unloading the wagon.

BRIEF DESCRIPTION OF THE INVENTION

An object of the present invention is to provide an automatic loading and unloading bale wagon that can be manufactured economically. A feature of the present automatic bale wagon is its reliability that is obtained by use of a small number of moving assemblies.

The chassis for the present bale wagon has tandem wheels and the frame of the wagon is mounted on a pivot between the wheels. A hydraulic cylinder is connected laterally between the chassis and frame to change the position of the frame from a transporting position where it is straight longitudinally on the chassis to a field position where it is rotated to make an acute angle with the chassis.

A pick-up conveyor is pivotally mounted to the front of the wagon to permit the front of the conveyor to be lowered to the ground when the frame of the wagon is being rotated from a straight position to the field position. While the wagon is being rotated from the field position to the straight, transporting position, one side of the frame of the pick-up conveyor engages a V-shaped draw bar attached to the front of the chassis, and the bar functions as an inclined plane for the side of the pick-up conveyor to raise the conveyor upwardly while it is being positioned nearly horizontally over the draw bar.

The main portion of the wagon comprises a plurality of movable, elongated storage compartments for rows of bales. An endless chain type conveyor with cross pieces moves along the bottom of the wagon to load the storage compartments successively as the compartments are rotated into a loading position over the loading conveyor. The pick-up conveyor approaches bales on the ground and conveys them upwardly and rearwardly to the front end of the loading conveyor.

The storage compartments are defined by dividers that extend radially from a rotatable, central shaft such that the configuration of an inner, main support for the rows of bales resembles an elongated paddle wheel. The main supporting shaft is rotatably mounted on its longitudinal axis, and after a compartment between adjacent dividers has been filled, the compartments as defined by the dividers are rotated to push the bales laterally off the loading belt conveyor to an arcuate outer support that subtends only the lower half of the inner support. As the compartments are rotated upwardly, the bales become supported entirely by the dividers and the structure that interconnects the inner edges of the dividers. An outer wall is not required above the compartments.

The conveyors are operated in a reverse direction to unload the wagon. Since the bales can be discharged from the pick-up conveyor directly to another conveyor at a storage building, the bales can be handled entirely by machine to move them from their location in a field to a hay barn.

DESCRIPTION OF THE PREFERRED EMBODIMENT

Figure 1:
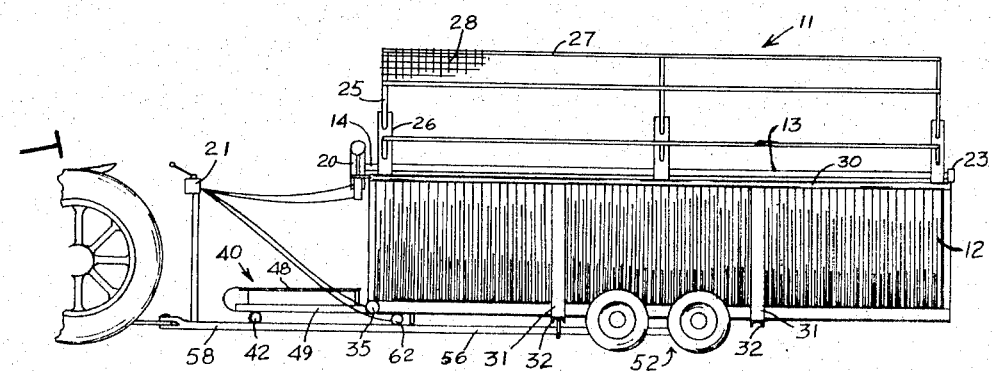
FIG. 1 is a side elevational view of the bale wagon according to this invention.
Figure 4:
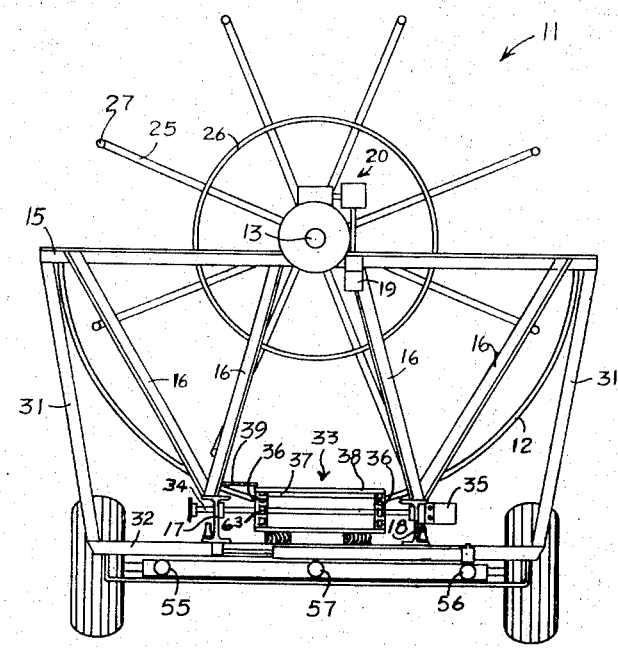
FIG. 4 is a front view of the wagon with the pick-up conveyor and draw bar omitted.

As shown in FIGS. 1 and 4, the storage compartments for rows of bales comprise a rotatable member 11 and an outer, fixed supporting and guiding member 12 subtending approximately the lower one-half portion of the rotary member. A center shaft 13 of the rotary member 11 has a front journal and bearing 14 supported by a front portion of the frame of the wagon including an upper, horizontal member 15 and a plurality of truss members 16 connected to a pair of lower, main, longitudinal I-beams 17 and 18 (FIG. 4). A hydraulic motor 19 is coupled through a gear reduction train 20 to the front end of the shaft 13 to rotate the shaft under the control of a manually operated hydraulic valve control assembly 21 (FIG. 1) that is placed within easy reach of the operator of a tractor connected to the draw bar 58. The rear end of the shaft 13 has a rear journal and bearing 22 supported on a horizontal member 23 shown in FIG. 5 and truss members 24 connected to the rear ends of the I-beams 17 and 18.

Figure 2:
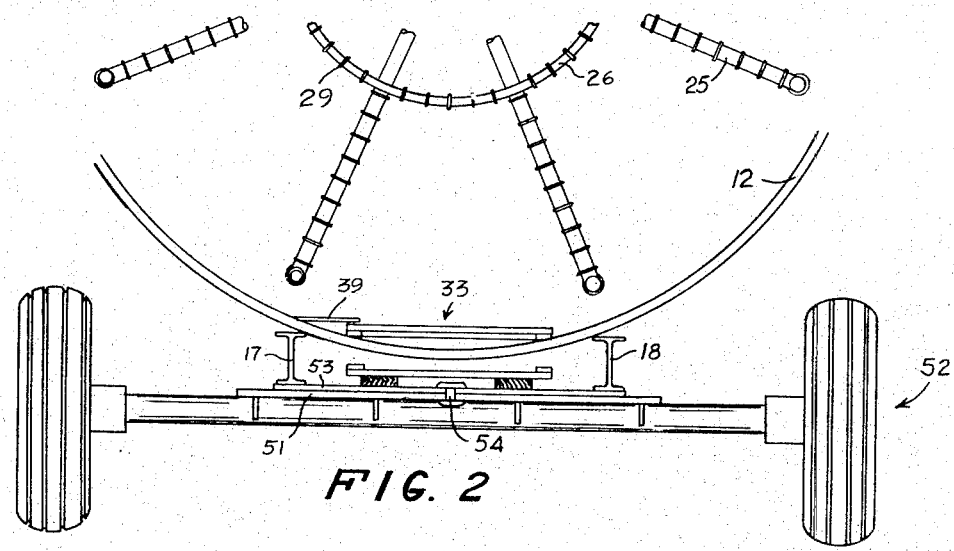
FIG. 2 is a partial cross-sectional view taken between the tandem wheels of FIG. 1 and viewed from the front to show the pivotal mounting of the wagon.

Preferably, the frame of the main rotatable member 11 has a shaft 13 and a plurality of radial supports 25 (FIG. 4) fabricated from iron pipe and a plurality of rings 26 fabricated from flat iron bars. As shown in FIGS. 1 and 4, the radial supports comprise equal spaced pipes extending radially in three transverse planes positioned respectively at the middle and the ends of the shaft. The radial supports 25 extend through equally-spaced holes in the rings 26 and are welded thereto, the diameter of the rings and the spacing of the radial supports are determined so that bales can rest on supporting surfaces defined by the adjacent radial supports outside the rings. The radial supports 25 in the different transverse planes are in alignment to form longitudinal planes, and longitudinal supports or pipes 27 (FIGS. 4 and 5) are welded to the outer ends of the aligned radial supports 25 that are in the same longitudinal planes but in different ones of the transverse planes. A satisfactory supporting surface for bales consists of woven wire 28 (FIG. 5) laid on one side of each of the planes defined by three aligned radial supports 25 and a respective longitudinal pipe 27, continued over the longitudinal pipe and back over the other side of the plane and then along a portion of the cylinder between adjacent longitudinal planes as defined by the rings 26 to the adjacent plane defined by the radial supports, and then the wire is continued in a like manner until compartments with three sides are formed between all the adjacent radial supports 25. The wire is tied by quite closely spaced loops 29 as shown in FIG. 2 to the frame members 25 and 27 and to the rings 26 of the rotatable frame 11. Also, adjacent portions of the wire 28 are tied together at quite closely spaced points along lines joining aligned radial members where they intersect the rings 26.

Each side of the frame of the bale wagon also includes an upper, longitudinal supporting side member 30 (FIG. 5) at about the same height as the shaft 13 and spaced a short distance outside the path of rotation of the radial dividers of the rotatable member 11. The side members 30 are supported by upwardly extending members 31 secured to the I-beams 17 and 18 by iron bars 32 that extend outwardly from the I-beams and are reinforced by slanting angle pieces (not shown).

The outer support 12, on which bales are supported while the open sides of the bale compartments of the rotatable member 11 are facing downwardly, is corrugated galvanized steel plate formed in an inwardly curving arc to conform to the path of rotation of the storage compartments. The upper edge of the corrugated steel plate on each side of the wagon is fastened to the respective upper longitudinal side member 30 and the lower portion of each side is attached to an adjacent I-beam 17 and 18. The direction of the corrugations of the outer support 12 is circumferential to facilitate the sliding of the bales along the inside surface of the outer support by rotation of the rotatable member 11.

An endless, chain-type loading conveyor 33 (FIGS. 4 and 5) is mounted along the bottom of the bale wagon between the I-beams 17 and 18, and it is centered below the rotatable storage compartments a short distance below the path of rotation of the outer, longitudinal frame members 27 of the rotatable member 11. A front, transverse shaft 34 of the conveyor is rotatable mounted between the I-beams 17 and 18 and is coupled to a reversible, hydraulic motor 35. The motor is controlled manually by the hydraulic valve control assembly 21 to move a row of closely spaced bales rearwardly to load a compartment defined by the woven wire 28, or forwardly to unload a compartment that is centered over the loading conveyor.

The moving portion of the conveyor 33 includes a flat, endless, link chain 36 along each side of the conveyor (FIG. 4), and a pair of sprocket wheels 63 secured to the front, transverse shaft 34. Rear idler sprocket wheels (not shown) are mounted between the I-beams 17 and 18 at the rear of the wagon to support the pair of chains 36 in the usual endless arrangement. A flat, smooth sheet of metal 37 is mounted between the upper portions of the I-beams 17 and 18 such that it is slightly below the upper portion of the chains 36 to provide a smooth, sliding surface. The bales that are being conveyed are supported and pushed by pieces of pipe 38 welded in place at equal intervals transversely between the pair of chains 36. The pieces of pipe welded to the chain support and guide the bales as they are being pushed laterally by the dividers of the rotatable member 11 while a different compartment is being positioned over the loading conveyor 33.

Figure 3:
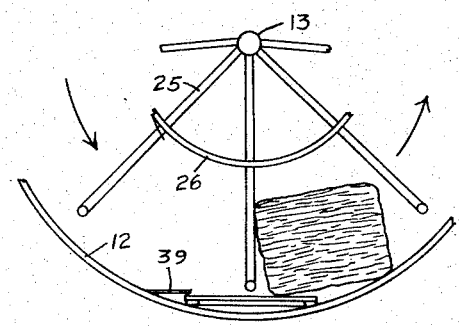
FIG. 3 is a fragmentary front view to show lateral movement of a row of bales from the loading conveyor.
Figure 5:
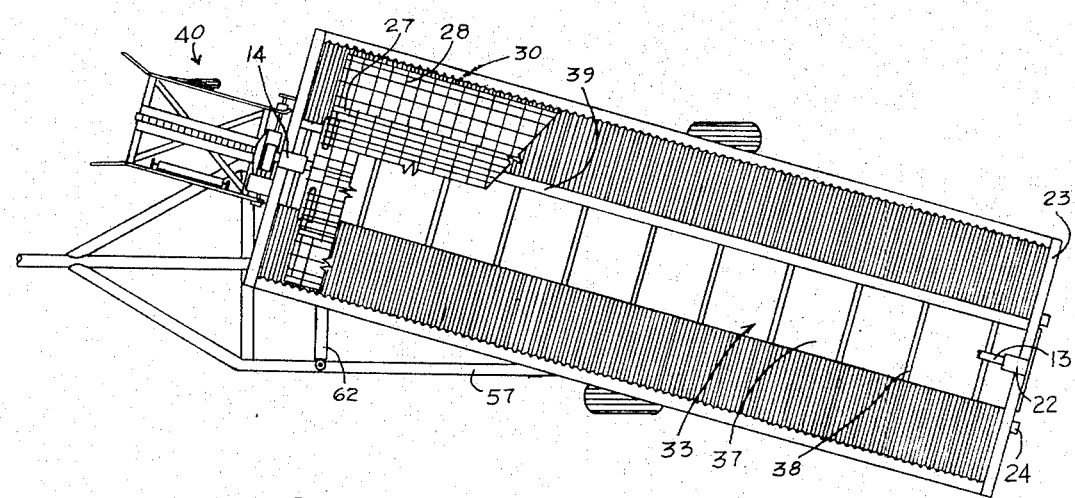
FIG. 5 is a top view of the bale wagon.

The compartments of the rotary member 11 are usually rotated in only one predetermined direction. The levels of the bottom edges of the outer supporting member 12 adjacent each edge of the loading conveyor 33 are fixed according to the direction of rotation. As shown in FIGS. 2, 3 and 5, when the direction of rotation of the member 11 is counterclockwise as viewed from the front of the wagon, that portion of the outer supporting member 12 near the left edge of the loading conveyor 33 has a guide plate 39 extending from the inner surface of the supporting member 12 at a level at least as high as the upper surfaces of the exposed transverse pipes 38 and preferably overlapping the adjacent ends of the pipes. While the bale wagon is being unloaded, the guide plate 39 will guide bales smoothly onto the transverse pipes 38 of the conveyor. The portion of the outer supporting member 12 adjacent the opposite edge of the conveyor 33 is substantially below the level of the exposed pipes 38 of the conveyor to facilitate lateral movement of the bales off the conveyor when the wagon is being loaded.

Figure 7:
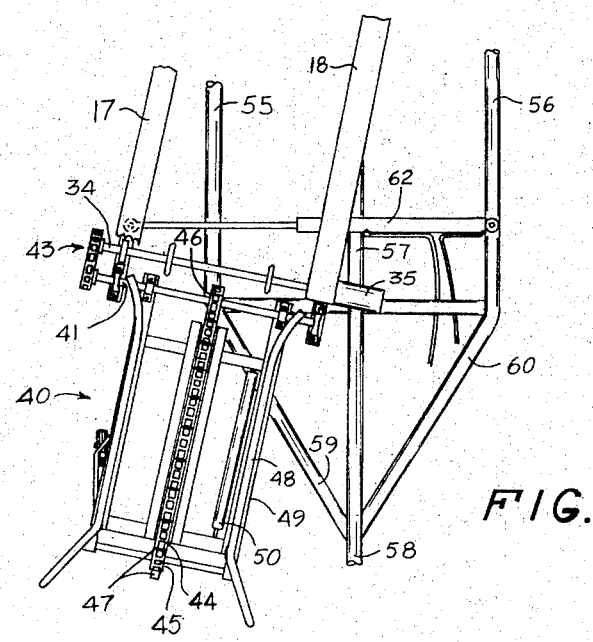
FIG. 7 is a top view of the pick-up conveyor and the front portions of the chassis and the wagon frame.

Bales are conveyed either to the loading conveyor 33 while loading or from the loading conveyor while unloading by the pick-up conveyor 40 (FIGS. 5 and 7). Each side of the frame of the pick-up conveyor 40 is pivotally mounted by a driven shaft 41 to the front ends of the I-beams 17 and 18 so that the front end of the pick-up conveyor 40 can be lowered to the ground to ride on a front mounted castor 42 (FIG. 1). The shaft 41 (FIG. 7) is driven through a sprocket and chain drive 43 from the loading conveyor shaft 34 that is connected to the reversible hydraulic motor 35.

Bales are carried from their location on the ground to the loading conveyor by a single endless chain 44 located centrally between the sides 49 of the frame of the pick-up conveyor. The chain passes over an idler sprocket wheel 45 at the lower end of the conveyor and over a driving sprocket wheel 46 secured to the central portion of the shaft 41 that is coupled to the adjacent driving shaft 34 of the loading conveyor 33. Teeth 47 project outwardly about one or two inches and are spaced somewhat less than a foot apart along the chain such that they catch sufficiently on a bale that is being approached to lift the bale and convey it rearwardly. The teeth are most conveniently made of steel and are welded to the steel links of the chain. A side rail 48 is mounted above each of the sides 49 of the pick-up conveyor, and the front ends of the side rails are spread outwardly to guide bales onto the conveyor. A roller 50 is mounted beneath the side 49 to engage a portion of a connecting member of the draw bar to raise the pick-up conveyor as described below.

The wagon is pivotally mounted on a chassis so that the wagon is rotatable from a transporting position (FIG. 1) in which the chassis and the frame of the wagon are in alignment to a field position (FIG. 5) in which the frame of the wagon is at an acute angle to the chassis. In the field position, the front end of the pick-up conveyor travels to lift bales from a path slightly to one side of the path of the tractor that is pulling the wagon.

As shown in FIG. 2, a lower plate 51 of a pivotal mounting is connected to a wheeled chassis 52, and a plate 53 is rotatably mounted on the plate 51 to support the I-beams 17 and 18 that are the main members of the frame of the bale wagon. the plates 51 and 53 rotate about a retaining pin 54 disposed through the center of the plates.

The draw bar assembly of the wheeled chassis includes three round members 55-57 (FIGS. 4 and 7), the members extend forwardly from each end and the center respectively of a cross member (not shown) attached to the wheel assembly of the wagon and terminate in a draw bar 58. The front ends 59 and 60 of the side members 55 and 56 respectively are turned inwardly toward the center member to form a triangle opposite the pick-up conveyor 40.

Figure 6:
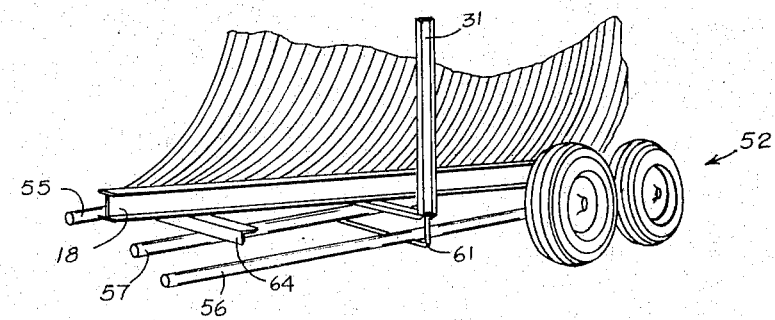
FIG. 6 is a partial, oblique side view to show supporting members that slide in contact with the frame.

In addition to the main upward support supplied to the frame of the wagon by the pivotal plates 51 and 53, a transverse bar 64 (FIG. 6) is welded to the lower surfaces of the front portions of the I-beams 17 and 18 to slide over the round members 55-57. In FIG. 6, the frame of the wagon is shown in the field position in which the bar 64 bears on the members 55 and 57 and it will also ride on member 56 when the wagon is in the transporting position. In order to prevent the front end of the wagon from bouncing upward from the chassis 52, a bar 61 is positioned below the chassis members 55-57 on a transverse line located in front of the wheels of the chassis and back of the bar 64; the ends of the bar 61 are connected to the frame of the wagon at points that are farther apart than the distance between the side members 55 and 56 of the chassis to permit rotation between the transporting and field positions.

The wagon is rotated on the chassis 52 between a transporting position and a field position by operation of a double-acting hydraulic actuator 62 (FIG. 7) connected between the chassis member 56 and the I-beam 17 of the wagon. The actuator is connected to the hydraulic valve control assembly 21, the assembly being operable in one control position to extend the piston of the actuator for rotating the wagon to the field position according to (FIG. 5) and operable to another control position to retract the piston of the actuator for rotating the wagon to the transporting position according to (FIG. 1). While the wagon is being rotated to the field position on the chassis, the roller 50 (FIG. 7) attached to the underside of the frame member 49 of the pick-up conveyor 40 follows the diagonal front end 59 of the adjacent chassis member 55 to lower the front end of the pick-up conveyor, and while the wagon is being rotated from the field position to the transporting position, follows the chassis portion 59 to raise the front end of the pick-up conveyor.

While the wagon is in the field position and a bale is contacted by the front of the pick-up conveyor 40, a respective control lever on the hydraulic valve control assembly 21 is operated to start the pick-up conveyor and the loading conveyor 33. As soon as the bale is completely on the pick-up conveyor, the control lever of the assembly 21 is again operated to stop the conveyors until the next bale is contacted. In this manner the bales are loaded close together in rows. When a compartment in the main rotatable member is full, a respective control lever of the hydraulic valve control assembly 21 is operated to start operation of the motor 19 for causing the rotatable member 11 to rotate and to force a row of bales to move toward one side and upwardly one-eighth of a revolution in a manner shown in FIG. 3 until the next empty compartment is positioned over the conveyor. The capacity of a model of the present bale wagon is 56 square or round bales in eight compartments of the wagon plus two bales on the pick-up conveyor.

When the compartments are full and two bales are resting on the pick-up conveyor, the respective control lever of the assembly 21 that is connected to a valve for controlling the actuator 62 is operated. Operation of the actuator returns the wagon to its transporting position for hauling the bales from the field. At a hay barn, the loading conveyor is operated to move in the opposite direction and the rotatably member 11 is rotated in the same direction one-eighth of a revolution after each row of bales is unloaded.

Mechanical or electro-mechanical control devices for sensing positions of the bales may be connected to the hydraulic control valves to start and to stop the conveyors automatically during loading. However, the little added convenience may not warrant the extra expense. The use of mechanical devices for controlling operation is shown in U.S. Pat. No. 2,867,340 to which reference has been made above.

When the wagon is being pulled in the field to pick up and load bales from the front of the wagon, an end gate is removably attached to the rear of the wagon to function as a stop at the end of the compartment that is positioned over the loading conveyor 33. The end gate can be readily removed, and the loading conveyor 33 operated in the direction to move bales from the rear to the front of the wagon for loading bales from the rear of the machine in the field and most appropriately from storage in the winter. Likewise, the bales can be unloaded from the rear to an elevator or to a feed lot.

I claim:

1. An automatic loading and unloading bale wagon comprising:
   an elongated frame, a plurality of rotatable storage compartments mounted on said elongated frame,
   a conveyor, said conveyor having a pick-up section pivoted on a horizontal axis to the front of said elongated frame and a loading section disposed longitudinally within said elongated frame,
   a wheeled chassis, a pivotal mounting on said wheeled chassis, said elongated frame being supported on said pivotal mounting, controllable means to rotate said elongated frame on said chassis between a straight transporting position and an angular field position in which said pick-up section is positioned to travel at one side of the path of travel of said wheeled chassis, said storage compartments comprising a rotatable frame shaped like an axially elongated paddle wheel mounted on its axis longitudinally above said elongated frame, an outer supporting member along each side of said elongated frame, each of said outer supporting members having an arcuate lateral cross section and spaced diametral ridges with their respective lower ends adjacent said loading section of said conveyor and extending in a curved line upwardly near said rotatable frame to a height approximately even with the axis thereof.

2. A bale wagon as claimed in claim 1 wherein said conveyor is an endless flat type conveyor, controllable motor means connected to said rotatable frame to rotate said storage compartments in only one direction, said outer supporting member over which each of said storage compartments pass as they approach said conveyor having a lower inner edge effectively above said loading section of said conveyor, and the other of said outer supporting members on the opposite side of said conveyor having a bottom inner edge effectively below the upper surface of said loading section of said conveyor.

3. A bale wagon as claimed in claim 1 wherein said pick-up section of said conveyor includes an endless flat conveyor having a pair of side frame members, a guide rail along the upper side of each of said frame members, said wheeled chassis has a V-shaped draw bar with its apex adapted for coupling to a tractor and its opposite ends connected to respective sides of the front end of said wheeled chassis, whereby one of said side frame members of said pick-up section of said conveyor engages an adjacent portion of said draw bar to raise it to a substantially level position for transportion as said frame is rotated on said wheeled chassis from said field position to said transporting position.

4. A bale wagon as claimed in claim 3 wherein the portion of said side frame that engages said draw bar has a roller mounted along its lower side to engage said draw bar.

5. A bale wagon as claimed in claim 1 wherein said elongated frame has in front of said pivotal mounting a cross member above said wheeled chassis and another cross member below said wheeled chassis, said cross members being adapted to slide in contact with said wheeled chassis to restrain vertical movement between said elongated frame and said wheeled chassis.

6. An automatic loading and unloading bale wagon comprising:

a wheeled chassis, an elongated frame mounted on said wheeled chassis, a rotor and outer supporting means forming a plurality of storage compartments, said rotor mounted longitudinally above said elongated frame and having radial dividers such that said rotor resembles an axially elongated paddle wheel, said compartments being defined by said dividers, an endless flat conveyor disposed longitudinally within said frame, the upper surface of said conveyor providing a supporting surface across which bales can be slid easily, the path of the outer edges of said dividers of said rotor being a short distance above said conveyor, the width of said conveyor being approximately the same as the width of each of said compartments, said outer supporting means attached to the sides of said elongated frame, said outer supporting means having first and second portions with arcuate cross sections extending outwardly and upwardly from adjacent respective sides of said endless flat conveyor and being disposed around and adjacent the path of the outer edges of said dividers of said rotor to a height at least comparable to the height of the axis of said rotor, the inside surface of said supporting means and the upper surface of said endless conveyor being adjacent to provide in at least one circumferential direction a continuous unobstructed support to facilitate the sliding of bales by rotation of said rotor, said endless flat conveyor being operable to convey bales along any one of said compartments positioned over the conveyor, and control means to rotate said rotor for moving laterally rows of bales positioned in respective ones of said storage compartments readily between said conveyor and said outer supporting means.

7. A bale wagon as claimed in claim 6 wherein said outer supporting means has spaced diametral ridges for its inside surface and said endless flat conveyor has spaced transverse bars to form its upper surface to facilitate the sliding of bales by rotation of said rotor.

8. A bale wagon as claimed in claim 7 wherein said rotor is rotatable in only one direction, the lower ends of said spaced diametral ridges of said first portion over which said storage compartments pass as they approach said endless flat conveyor having inner surfaces effectively above said transverse bars of said endless flat conveyor and the lower ends of said spaced diametral ridges of said second portion on the opposite side of said endless flat conveyor having inner surfaces below the upper surfaces of said transverse bars.

* * * * *